US005447975A

United States Patent [19]

Uschold

[11] Patent Number: 5,447,975

[45] Date of Patent: Sep. 5, 1995

[54] PVF OF IMPROVED THERMAL STABILITY

[75] Inventor: Ronald E. Uschold, West Chester, Pa.

[73] Assignee: E. I. Du Pont de Nemours and Company, Wilmington, Del.

[21] Appl. No.: 352,751

[22] Filed: Dec. 2, 1994

Related U.S. Application Data

[63] Continuation-in-part of Ser. No. 166,678, Dec. 16, 1993, abandoned.

[51] Int. Cl.[6] .......................... C08L 27/14; C08K 5/13; C08K 5/526; C08K 5/378

[52] U.S. Cl. .................................... 523/435; 525/115; 525/120; 526/250

[58] Field of Search ......................... 523/435; 526/250; 525/115, 120

[56] References Cited

U.S. PATENT DOCUMENTS 3,976,617 8/1976 Vasta .................................. 523/435

*Primary Examiner*—John C. Bleutge
*Assistant Examiner*—D. R. Wilson
*Attorney, Agent, or Firm*—Richard H. Burgess

[57] ABSTRACT

Mixtures of PVF, bis-phenol-epichlorohydrin copolymer, hindered phenol, phosphite and mercaptoarylimidazole permit formation of thick PVF articles.

12 Claims, 1 Drawing Sheet

PVF OF IMPROVED THERMAL STABILITY

CROSS REFERENCE TO RELATED APPLICATION

This application is a continuation-in-part of pending prior application Ser. No. 08/166,678, filed Dec. 16, 1993, now abandoned, and entitled PVF of Improved Thermal Stability.

BACKGROUND OF THE INVENTION

Poly(vinyl fluoride) (PVF) has long been used in sheet form for a variety or protective applications. Sheets of PVF are typically prepared by casting a dispersion or the polymer and subsequently coalescing the dispersion in the shape of the finished film. This preparation has previously been required because poly(vinyl fluoride) typically decomposes at melt processing temperatures, rendering melt fabrication techniques inapplicable. These known preparation techniques have long limited the form or PVF articles and, particularly, the thickness of film made from PVF.

SUMMARY OF THE INVENTION

The instant invention provides an improved PVF composition having improved thermal stability that preparation of articles having a significantly greater thickness than has heretofore been possible, such as by compression molding or ram extrusion.

Specifically, the present invention provides a compression-moldable polymeric mixture consisting essentially of poly(vinyl fluoride) (PVF) and, by weight of the final composition, (a) about from 0.1 to 2.0% of copolymer of bis-phenol and epichlorohydrin according to the formula

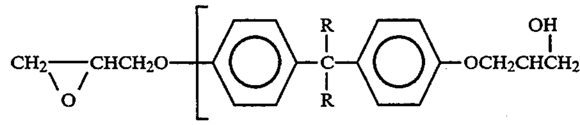

wherein n has an average value of from 0 to 9.0 and wherein the R moieties are independently selected from $CH_3$, $CF_3$, F and H.

(b) about from 0.1 to 1.0% of hindered phenol containing 2,6-dialkyl substituents;

(c) about from 0.2 to 2.0% of alkyl aryl phosphite; and (d) about from 0.0 1 to 0.4% of mercaptoarylimidazole which consists essentially of a compound of the formula

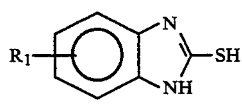

where $R_l$ is selected from hydrogen and alkyl of 1–4 carbon atoms.

DETAILED DESCRIPTION OF THE INVENTION

Figure 1:
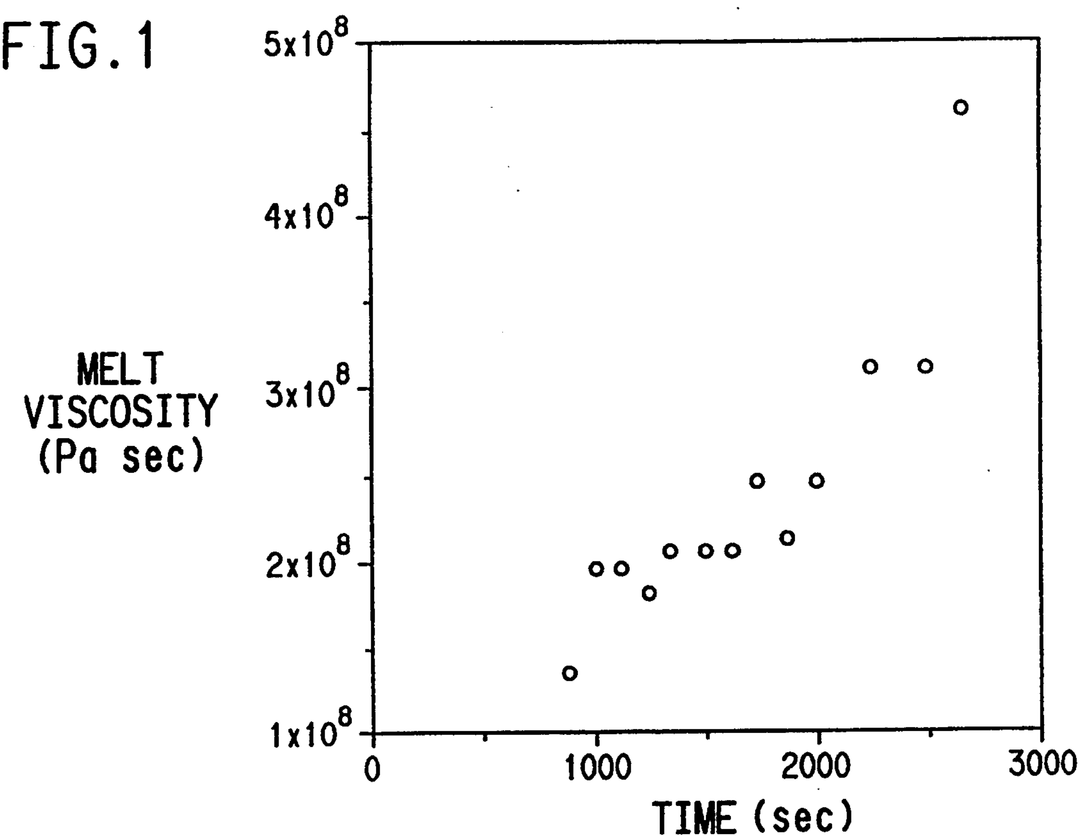
FIGS. 1 and 2 are graphical representatives of the performance characteristics of a control composition and a PVF mixture of the present invention.

The present invention is applicable to PVF of the type long known in the art and described, for example, in U.S. Pat. Nos. 2,419,008, 2,510,783, 2,599,300 and 3,139,207.

The first component of the additive mixture is at least one epoxy resin copolymer of bis-phenol and epichlorohydrin. Such copolymers are characterized by the general formula

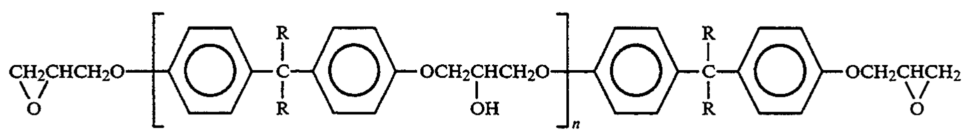

wherein the R moieties are independently selected from $CH_3$, $CF_3$, F and H, of which $CH_3$ is preferred with equivalent weights of 170 to 1500 and with having a value from 0 to 9 and preferably an average value from 0.1 to 5.5. Such copolymers, in which R is $CH_3$, are commercially available from Shell as Epon® resins. The resin specifically designated as Epon® 828 with an equivalent weight of 185 to 192 and an n average value of 0.1 to 0.15 has been found to be particularly satisfactory. This type of copolymer is present in the additive mixture in the amount of about from 0.1 to 2.0 % of the final PVF composition, and preferably about from 0.1 to 1.0%. Epon® 1004F is also used with an equivalent weight of 800 to 925 and an n average value of 4.4 to 5.5.

The second additive in accordance with the present invention is at least one hindered phenolic compound, preferably of the general formula

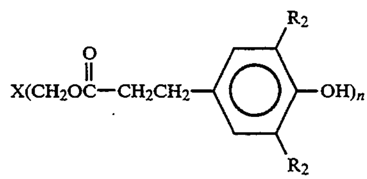

wherein X is C or $CH2SCH_2$ and n is 4 or 2, respectively, and $R_2$ is alkyl of 1–6 carbon atoms, and preferably tertiary butyl. Particularly satisfactory hindered phenols of this type are those commercially available as Irganox® 1035 and Irganox® 1010, both commercially available from Ciba-Geigy. The structural formulas of each of these preferred hindered phenols is as follows:

Irganox ® 1035

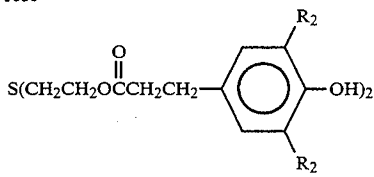

Irganox ® 1010

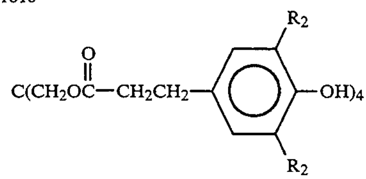

wherein $R_2$ is tertiarybutyl.

The hindered phenol is present in the formulations of the present invention in an amount equal to about from 0.1 to 1.0 % by weight, and preferably about from 0.1 to 0.5%.

The third component in the present additive blend is at least one alkyl aryl phosphite, having low volatility. One such phosphite is that commercially available from GE Chemicals as Weston ® THOP and represented by the following formula:

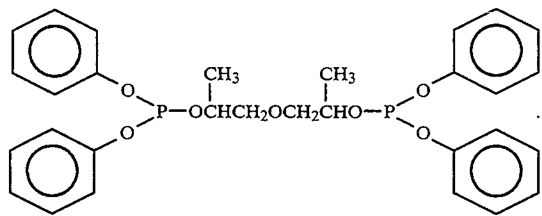

Another phosphite which can be used in the present invention is Ultranox ® 626, having the formula:

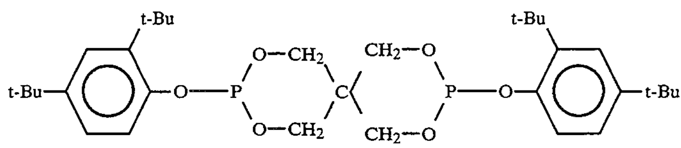

which has been found to be particularly preferred.

The phospite is present in an amount equal to about from 0.2 to 2.0%, and preferably about from 0.2 to 1.0%.

The fourth component of the present additive mixture is at least one mercaptoarylimidazole, present in an amount of about from 0.01 to 0.4% by weight of the PVF composition. A wide variety of mercaptoarylimidazoles can be used, having the general formula

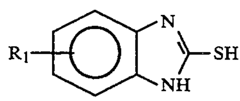

wherein $R_1$ is selected from hydrogen and alkyl of 1–4 carbon atoms. Particularly satisfactory is that imidazole commercially available as Vanox ® MTI available from R. T. Vanderbilt.

As will be recognized by those skilled in the art, the present mixtures can further comprise additives typically used in PVF, such as pigment fillers and UV light stabilizers.

The additives of the present invention can be incorporated with the PVF in any convenient processing sequence. For example, the additives can be admixed with the PVF and subsequently melt processed or compression molded into the desired final configuration. In the alternative, one or more of the components can be combined in the mixture in the form of a dispersion or solution. For example, solutions of any or all of the four additive components can be combined with PVF, the PVF being in particulate form or in the form of an emulsion or dispersion. After combination of the components, any residual dispersant or solvent is removed and the resulting PVF composition molded into its final configuration, by conventional melt processing techniques such as compression molding.

The additives of the present invention permit a far broader range of fabricating techniques for PVF articles than have heretofore been available. Previously, PVF could be fabricated only in the presence of a coalescing solvent, such as dimethyl acetamide, propylene carbonate or N-methyl pyrrolidone. A wide variety of other latent solvents can be used for the preparation of PVF articles, as disclosed in Bartron U.S. Pat. No. 2,953,818, hereby incorporated by reference. The removal of such solvents limited the thickness of articles that could be prepared by these techniques.

The mixtures of the present invention permit the preparation of formed PVF articles by melt processing techniques and in substantially greater cross-sectional dimensions than had previously been possible. These shaped articles are characterized by excellent mechanical properties, including tensile strength, elongation, creep resistance, high flex modulus and compressive strength. By way of illustration, shaped articles having a thickness of from 0.05 centimeters to about 2.5 centimeters have been successfully prepared, significantly broadening the possible end use applications for PVF articles. Thicknesses of greater than about one inch can, however, result in irregular physical properties and physical degradation of the PVF polymer due to the extended processing period at elevated temperatures. The excellent properties of the present compositions permit their use in a wide variety of applications in which those properties would be of benefit. Included in such applications are components useful as valve seats, valve tips, gaskets, and spacers. Many other applications will be evident to those skilled in the art.

The present invention is further illustrated by the following specific examples, in which parts and percentages are by weight unless otherwise indicated.

EXAMPLE 1 AND CONTROL EXAMPLES A–D

To a dispersion of about 40% PVF in propylene carbonate was added 0.5 phr (parts per hundred parts resin) each of the additives listed in the tables below. Steel shot was added and the dispersions were placed on a paint shaker and shaken for 15 min. Films were made by casting the dispersions on glass plates and drying the castings in a shallow covered pan for 1 min at 400° F. (204° C.) then uncovering the pan and continuing the drying 4 additional minutes at 400° F. (204° C.) in a circulating air oven. High quality transparent colorless coated plates with no residual solvent in the PVF were obtained in this way.

The color of the films cast on glass was measured by means of a colorimeter to establish baseline color data and the samples were then returned to the air oven for aging. The samples were removed from the oven periodically and the color was measured. The change in color, ΔE, was determined by subtracting the baseline values from the newly measured values. These numbers are reported in the Table 1 below.

The sample without any additive discolored strongly during the 2 hour test period while the test samples containing phenolic antioxidant or phenolic antioxidant in combination with Epon ® 828 were hardly changed.

TABLE 1

Color Change (ΔE) Measured for PVF Film in Air at 400° F.

| Time (hrs) | Additive: None | Irganox ® 1035 | Irganox ® 1035 Epon ® 828 | Irganox ® 1010 Epon ® 828 |
|---|---|---|---|---|
| 0 | 0 | 0 | 0 | 0 |
| 0.5 | 0.18 | 0.11 | 0.03 | 0.21 |
| 1.0 | 1.02 | 0.20 | 0.29 | 0.39 |
| 1.5 | 1.41 | 0.09 | 0.15 | 0.32 |
| 2.0 | 1.93 | 0.12 | 0.14 | 0.35 |

Alternatively, PVF films were cast on polyester webs with the dispersions prepared above by drying the castings 5 min. at 400° F. (204° C.) in a circulating air oven. The polyester films were clamped in metal frames before they were placed in the oven to prevent the web from curling upon itself as the PVF dispersion dried. In this way high quality transparent colorless films with no residual solvent content could be prepared. The product PVF films were peeled from the polyester web and a small sample cut from the film was placed in a thermal gravimetric analyzer (TGA). The TGA was operated in an isothermal mode with an air stream constantly sweeping over the sample. The weight loss of the sample was monitored with time and the results of the measurements are recorded in Table 2 below.

The control sample that does not contain additive lost weight at a significantly faster rate than did the samples stabilized by phenolic additive or by phenolic additive in combination with Epon ® 828.

TABLE 2

TGA Weight Retained (%) for PVF in Air at 295° C.

| Time (hrs) | Additive: None | Irganox ® 1035 | Irganox ® 1035 Epon ® 828 | Irganox ® 1010 Epon ® 828 |
|---|---|---|---|---|
| 0 | 100.00 | 100.00 | 100.00 | 100.00 |
| 10 | 100.58 | 100.00 | 99.89 | 99.67 |
| 20 | 98.78 | 99.33 | 99.22 | 98.81 |
| 30 | 97.00 | 98.33 | 98.44 | 97.37 |
| 40 | 95.33 | 97.11 | 97.56 | 96.14 |
| 50 | 93.74 | 95.89 | 96.56 | 95.10 |
| 60 | 92.41 | 94.67 | 95.67 | 94.21 |

Film samples on glass and polyester substrates were prepared as described above. Additives were added to PVF dispersion manufactured by the DuPont Company in an 80% by weight propylene carbonate 20% by weight toluene solvent mixture. The presence of toluene in the dispersion eliminated defects in the cast PVF films because of the limited solubility of some additives in propylene carbonate. The resistance of the test films to weight loss and discoloration due to thermal degradation was measured as described above and the results are tabulated below in Table 3. The Tinivan ® 622 LD has the formula:

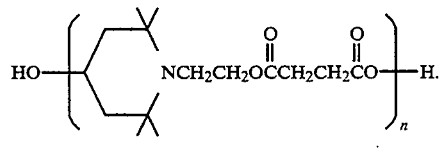

Very low discoloration was observed in the PVF film containing the four component additive system of Example 1 and a low rate of weight loss for the PVF film containing the four component additive system of Control Example D, all as shown in Table 3. However, the system of Control Example D, exhibited substantial color change, and, discussed below, experienced a substantial increase in viscosity.

TABLE 3

Heat Resistance of PVF Films Containing Additive Mixtures

| Example | A | B | C | 1 | D |
|---|---|---|---|---|---|
| | Additive Formulation (phr) | | | | |
| Irganox ® 1035 | 0.41 | 0.40 | 0.20 | 0.20 | 0.20 |
| Epon ® 828 | 1.00 | 0.50 | | 0.50 | 0.50 |
| Ultranox ® 626 | | 0.20 | 0.20 | 0.20 | 0.20 |
| Tinuvin ® 622 LD | | | 0.20 | | 0.20 |
| Vanox ® MTI | | | | 0.20 | |
| Time (hrs) | Color Change (ΔE) in Air @ 400° F. | | | | |
| 7 | 4.95 | | | | 4.19 |
| 14 | 50.56 | 42.06 | 16.77 | 2.33 | 28.47 |
| Time (min.) | TGA Weight Retained (%) in Air @ 240° C. | | | | |
| 0 | 100.32 | 100.00 | 100.00 | 100.00 | 100.23 |
| 50 | 99.26 | 99.85 | 99.76 | 99.88 | 100.06 |
| 100 | 98.84 | 99.60 | 99.29 | 99.61 | 99.86 |
| 200 | 98.13 | 99.02 | 97.73 | 98.33 | 99.28 |
| 300 | 97.15 | 97.28 | 95.32 | 96.42 | 98.29 |
| 360 | 96.44 | 95.95 | 93.67 | 95.14 | 97.56 |

EXAMPLE 2 AND CONTROL EXAMPLE E

In order to study the thermal stability of PVF stabilized with the four components used Examples 1 and Control D in more detail, the melt creep viscosity was measured for samples containing each of the mixtures, in the quantities specified in Table 4 below.

TABLE 4

| | Example 2 | E |
|---|---|---|
| | Additive Formulation (phr) | |
| Irganox ® 1035 | 0.30 | 0.20 |
| Epon ® 828 | 0.50 | 0.40 |
| Ultranox ® 626 | 0.60 | 0.20 |
| Tinuvin ® 622 LD | | 0.10 |
| Vanox ® MTI | 0.10 | |

Melt creep viscosity was measured with a Thermomechanical Analyzer (TMA) equipped with a parallel plate viscometer, DuPont TMA model 943. The viscosities measured by this method are obtained at low shear rates on polymer melts and are especially useful for judging the processability of very high viscosity materials in low shear fabrication processes such as compression molding or ram extrusion.

Figure 2:
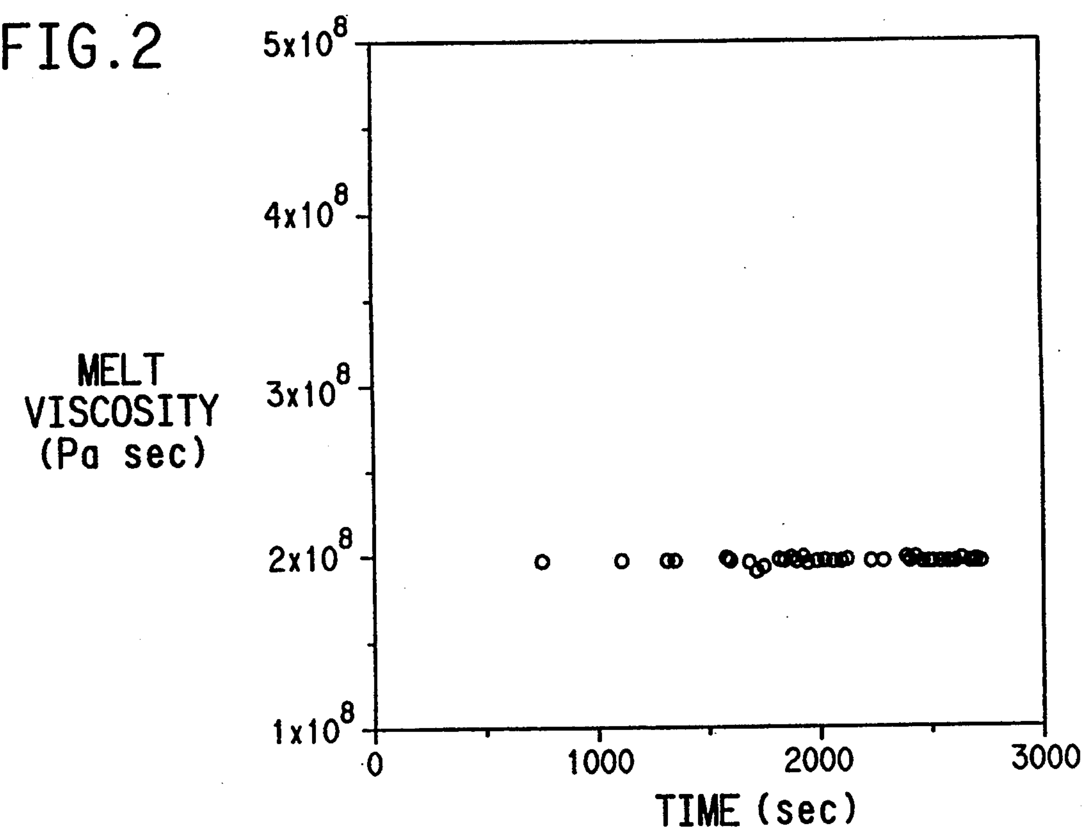

The results obtained for each sample are summarized in FIGS. 1 and 2. In this case the additives were added as acetone solutions to the desired amount of dry PVF powder to give the concentration indicated by the formulation. Additional acetone was added, as needed, to produce a smooth paste which was mixed thoroughly by hand. The pastes were dried to constant weight in an air oven at 90°–100° C. The dried compounds were ground to a powder, placed in a stainless steel mold with a 3″×6″×0.0625″ (7.6×15.2×0.16 cm) cavity, and heated in a press at 220° C. for two minutes with the jaws of the press just touching the top and bottom plates of the mold. Sufficient pressure was then applied with the press to completely close the mold and such pressure was maintained for an additional two minutes. The press and mold were then cooled to a temperature less than 120° C. by circulating water through the press platens before pressure on the mold was released. The PVF sheet was removed from the mold and used to prepare a sample for TMA analysis following the instructions given in the instrument operating manual.

The results in FIG. 1 show that the melt creep viscosity for compound E in Table 4 increased significantly from about $1\times10^8$ Pa·sec to nearly $5\times10^8$ Pa·sec during the 45 minute period of the test. This indicates that chemical changes, perhaps crosslinking, are occurring and that the compound has limited thermal stability. The change in properties makes this compound undesirable for use in melt fabricating processes consistent with the high viscosity of the compound.

By contrast, the results in FIG. 2 show that the melt creep viscosity of compound 2 in Table 4 remains constant during the entire duration of the test. This shows the superior heat resistance of compounds containing the additives of the present invention, and demonstrates the advantages of the present formulations in melt processing.

EXAMPLES 3–13 AND COMPARATIVE EXAMPLES F–L

The mixture of Irganox® 1035, Ultranox® 626, Epon® 828 and Vanox® MTI was investigated further. The mixtures listed in Table 4 were prepared by weighing each component into a weighed portion of PVF powder. To insure good distribution of the components, acetone was added to form a smooth paste which was thoroughly mixed by hand. Each mixture was then dried in an air oven at 90°–100° C. A portion of each mixture was used for TGA measurements in air and the percent of the sample remaining after 6 hours at 240° C. is recorded in Table 5. The balance of each PVF mixture was added to sufficient propylene carbonate/toluene solvent in 80%/20% mixture by weight to give a dispersion of 40% solids by weight. The dispersion was processed into a smooth coating by adding steel shot and shaking on a paint shaker for 30 minutes. The resulting dispersions were coated on glass plates and used to measure color change on aging as described in Example 1. The color measurements obtained after 14 hours at 400° F. (204° C.) are also recorded in Table 5.

Statistical analysis of these results confirmed the significance of each of the four additive components of the present mixtures for the stabilization of PVF.

TABLE 5

Variables and Responses for Designed Experiment

| Example | Irganox ® 1035 | Ultranox ® 626 | Epon ® 828 | Vanox ® MTI | Color ΔE | Weight % |
|---|---|---|---|---|---|---|
| 3 | 0.10 | 0.60 | 0.80 | 0.40 | 4.72 | 91.62 |
| F | 0.40 | 0.40 | 0.20 | 0.0 | 4.12 | 94.42 |
| 4 | 0.40 | 0.20 | 0.80 | 0.20 | 4.74 | 95.06 |
| 5 | 0.25 | 0.40 | 0.80 | 0.40 | 5.84 | 92.85 |
| G | 0.25 | 0.20 | 0.50 | 0.00 | 7.38 | 95.08 |
| 6 | 0.10 | 0.20 | 0.80 | 0.40 | 5.47 | 93.53 |
| 7 | 0.10 | 0.40 | 0.20 | 0.40 | 6.43 | 88.50 |
| 8 | 0.25 | 0.20 | 0.20 | 0.20 | 4.60 | 92.85 |
| 9 | 0.40 | 0.40 | 0.80 | 0.40 | 5.30 | 92.41 |
| H | 0.40 | 0.20 | 0.80 | 0.00 | 3.76 | 95.62 |
| I | 0.40 | 0.60 | 0.80 | 0.00 | 3.41 | 95.36 |
| 10 | 0.10 | 0.40 | 0.50 | 0.20 | 3.97 | 92.71 |
| 11 | 0.10 | 0.40 | 0.50 | 0.20 | 4.02 | 92.79 |
| 12 | 0.40 | 0.20 | 0.50 | 0.40 | 5.58 | 94.46 |
| 13 | 0.40 | 0.60 | 0.20 | 0.40 | 4.10 | 90.80 |
| J | 0.10 | 0.60 | 0.20 | 0.00 | 12.22 | 93.10 |
| K | 0.10 | 0.40 | 0.80 | 0.00 | 17.45 | 92.22 |
| L | 0.10 | 0.20 | 0.20 | 0.00 | 39.25 | 92.50 |

EXAMPLE 14

Articles were made from dry PVF resin formulated as in Example 2. PVF plaques 3″×6″×0.0625″ (7.6×15.2×0.16 cm) in size were molded as described in Example 2 and tensile test specimens were die cut from them. Tensile strength and ultimate elongation were measured at different temperatures according to ASTM method D1708 and flex modulus was determined at room temperature according to ASTM method D790. The averaged results from five measurements of each property are displayed in Table 6. The high values of these properties show the PVF plaques to be high quality material and useful for the manufacture of mechanical goods. An attempt to mold a 3″×6″×0.0625″ (7.6×15.2×0.16 cm) plaque from PVF that did not contain any stabilizers resulted in material that was blackened in places, poorly fused and brittle. Such material has no useful mechanical properties.

PVF pellets 0.50″ (1.27 cm) in diameter and 2″ (5.1 cm) long were compression molded as described in Example 2 but the time in the press was increased to 5 minutes warm up without applied pressure followed by 5 minutes under pressure to permit adequate heat transfer through the thicker sample. The pellets were used to measure compressive strength by ASTM method D695. An average value of 11,800 psi (82 MPa) was determined from measurements on four pellets. The high compressive strength further shows the utility of molded PVF articles in applications such as valve seats or tips and gaskets or spacers where high compressive strength is important.

TABLE 6

Tensile Properties of Compression Molded PVF

| Property | Temperature | Units | Result | Units | Result |
|---|---|---|---|---|---|
| Tensile Strength | 23° C. | psi | 5,600 | MPa | 39 |
| | 50° C. | psi | 4,000 | MPa | 28 |
| | 75° C. | psi | 4,000 | MPa | 28 |
| | 100° C. | psi | 2,300 | MPa | 16 |
| Elongation | 23° C. | % | 230 | | |
| | 50° C. | % | 220 | | |
| | 75° C. | % | 360 | | |
| | 100° C. | % | 270 | | |
| Flex Modulus | 23° C. | K psi | 370 | GPa | 2.6 |

Cylinders of PVF were prepared by packing 50 g of PVF into a steel cylinder mold 2.25" (5.7 cm) in diameter and 4" (10.2 cm) high. Cylindrical metal end pieces that slide into the mold body were positioned on each end and the powder was compressed at room temperature by applying 50,000 lbs (22,700 kg) force to the end pieces for five minutes. To facilitate removal of the PVF preform after compression, the inside surfaces of the mold were sprayed with fluorocarbon resin release agent before filling the mold. The compacted PVF cylinder was pushed from the mold cavity to yield a green preform 2.25" (5.7 cm) in diameter and 0.64" (1.6 cm) high. The preforms had an opaque white chalklike appearance and were brittle. The cylinders were coalesced above the melting point of the PVF by placing them unrestrained in a nitrogen swept oven programmed to run from room temperature to 220° C. and back to room temperature at a rate of 0.5° C./min. A slow heating rate was essential to avoid crack formation in the sample during coalescence and shrinkage of the part during sintering. The sintered cylinders were 2.0" (5.1 cm) in diameter and 0.70" (1.8 cm) high. They now had a translucent off-white appearance and were extremely tough. This result shows the high melt creep viscosity of PVF allows nontraditional fabrication methods to be employed. We further demonstrated that sintered cylinders could be worked into complex shapes by standard machine shop methods with the aid of a lathe, milling machine and drill press.

I claim:

1. A compression-moldable polymeric mixture consisting essentially of poly(vinyl fluoride) (PVF) and, by weight of the final composition, (a) about from 0.1 to 2.0% of copolymer of bis-phenol and epichlorohydrin according to the formula

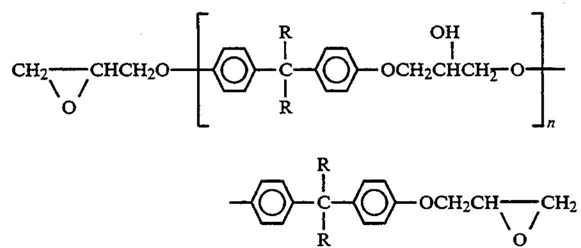

wherein n has an average value of from 0 to 9.0 and wherein the R moieties are independently selected from $CH_3$, $CF_3$, F and H.

(b) about from 0.1 to 1.0% of hindered phenol containing 2,6-dialkyl substituents;

(c) about from 0.2 to 2.0% of alkyl aryl phosphite; and (d) about from 0.01 to 0.4% of mercaptoarylimidazole which consists essentially of a compound of the formula

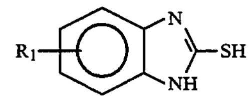

where $R_1$ is selected from hydrogen and alkyl of 1–4 carbon atoms.

2. A polymeric mixture of claim 1 wherein R is $CH_3$.

3. A polymeric mixture of claim 1 wherein $R_1$ is methyl.

4. A polymeric mixture of claim 1 comprising about from 0.1 to 1.0% of component (a).

5. A polymeric mixture of claim 1 wherein the hindered phenol consists essentially of a composition of the general formula

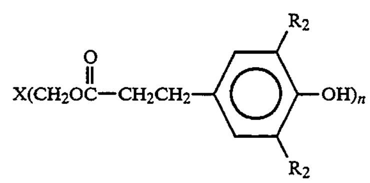

wherein X is C or $CH_2SCH_2$ and n is 4 or 2, respectively, and $R_2$ is alkyl having 1–6 carbon atoms.

6. A polymeric mixture of claim 5 wherein $R_2$ is tertiary-butyl.

7. A polymeric mixture of claim 5 comprising about from 0.1 to 0.5% of the hindered phenol.

8. A polymeric mixture of claim 1 wherein the alkyl aryl phosphite consists essentially of a compound of the formula

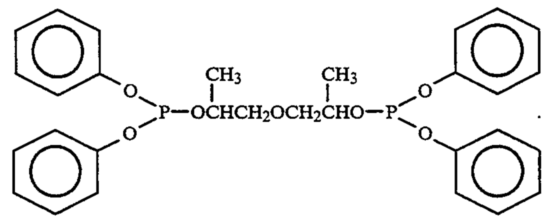

9. A polymeric mixture of claim 8 comprising about from 0.2 to 1.0% of the alkyl aryl phosphite.

10. A polyvinyl fluoride composition of claim 1 wherein the alkyl aryl phosphite consists essentially of a compound of the formula

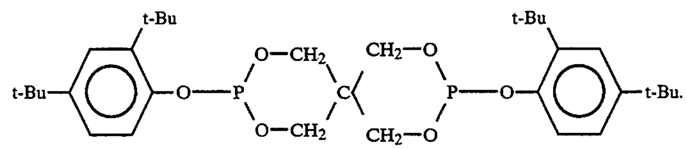

11. A polymeric mixture of claim 10 comprising about from 0.2 to 1.0% of the alkyl aryl phosphite.

12. A shaped article of the polymeric mixture of claim 1 having a thickness of at least about 0.02 inches.

* * * * *